US008630804B2

(12) United States Patent
Simon

(10) Patent No.: US 8,630,804 B2
(45) Date of Patent: Jan. 14, 2014

(54) METHOD FOR GEOLOCATING AN OBJECT BY MULTITELEMETRY

(75) Inventor: Alain Simon, Les Mesnuls (FR)

(73) Assignee: Thales, Neuilly sur Seine (FR)

( * ) Notice: Subject to any disclaimer, the term of this patent is extended or adjusted under 35 U.S.C. 154(b) by 199 days.

(21) Appl. No.: 13/132,616

(22) PCT Filed: Dec. 4, 2009

(86) PCT No.: PCT/EP2009/066448
§ 371 (c)(1),
(2), (4) Date: Jun. 3, 2011

(87) PCT Pub. No.: WO2010/063844
PCT Pub. Date: Jun. 10, 2010

(65) Prior Publication Data
US 2011/0231094 A1   Sep. 22, 2011

(30) Foreign Application Priority Data

Dec. 5, 2008  (FR) ...................................... 08 06842
Dec. 5, 2008  (FR) ...................................... 08 06843

(51) Int. Cl.
*G01C 21/00* (2006.01)
(52) U.S. Cl.
USPC ........................... 701/468; 701/485; 701/492
(58) Field of Classification Search
USPC ......... 701/408, 412, 468, 494, 495, 517, 519, 701/537, 538, 492, 300
See application file for complete search history.

(56) References Cited

U.S. PATENT DOCUMENTS

| 8,170,583 | B2* | 5/2012 | Shkedi ...................... 455/456.1 |
| 8,380,218 | B2* | 2/2013 | Gfeller et al. ............... 455/456.1 |
| 2003/0001777 | A1 | 1/2003 | Johnson |
| 2007/0103671 | A1 | 5/2007 | Ash |

FOREIGN PATENT DOCUMENTS

| EP | 0583972 A1 | 2/1994 |
| FR | 2897163 A1 | 8/2007 |
| GB | 624026 A1 | 5/1949 |

OTHER PUBLICATIONS

Bais A et al., "Single Landmark Based Self-Localization of Mobile Robots", pp. 67-67, Computer and Robot Vision, 2006 The 3rd Canadian Conference on, IEEE, Piscataway NJ, USA Jun. 7 2006.

* cited by examiner

*Primary Examiner* — Richard Camby
(74) *Attorney, Agent, or Firm* — Baker Hostetler LLP

(57) ABSTRACT

A method for geolocating a fixed non-cooperating object by means of an embedded system onboard a mobile platform, equipped with distance acquisition means for acquiring the distance between the object and the system, and position acquisition means for acquiring the position of the system, includes acquiring two distance measurements of the object relative to two distinct positions of the system, thus defining two object position-distance pairs, the positions being those of the system and being obtained by the position acquisition means, and the distances being obtained by the distance acquisition means. The method also includes acquiring at least one other object position-distance pair, and calculating the geolocation of the object from these object position-distance pairs.

23 Claims, 6 Drawing Sheets

METHOD FOR GEOLOCATING AN OBJECT BY MULTITELEMETRY

CROSS-REFERENCE TO RELATED APPLICATIONS

This application is a National Stage of International patent application PCT/EP2009/066448, filed on Dec. 4, 2009, which claims priority to foreign French patent applications FR 08 06842 and FR 08 06843, filed on Dec. 5, 2008, the disclosures of which are incorporated herein by reference in their entirety.

FIELD OF THE INVENTION

The field of the invention is that of the geolocating of a fixed non-cooperating object, by means of an optronic system mounted on a mobile platform. The expression "non-cooperating object" should be understood to mean a discrete object not emitting any signal in its environment (notably in the form of electromagnetic waves) and not exhibiting any cooperative behavior (in acquiring station in a place having specific characteristics or planned in advance in particular). The object may be situated at a few tens of kilometers.

BACKGROUND OF THE INVENTION

Since the beginnings of coastal or astronomic navigation, methods have been used to locate an object by comparing its apparent position relative to known positions of listed objects called landmarks.

Another known method is to proceed with location by manually or automatically comparing images of the object with reference data such as mapped images or data recorded on the ground. The results obtained are sensitive to the diachronism between these two sources (notably the differences of orientation between the images of the object and the mapped images, to the time-stamping and spectral band differences of the two sources). Improvement of the instrumental devices for measuring platform positions and attitudes in real time, for modeling the observation equations that describe the image exposure geometry, of the digital estimation techniques and of the computation means have made it possible to make systematic and automate certain basic processing operations to facilitate the interpretation and the superposition or merging of geographic data (stereo-restoration, aerotriangulation, rectification, etc.). These techniques have contributed to reducing the impact of the orientation errors of the snapshots on the geolocating of the image content.

These approaches have a number of drawbacks:
the gathering of objects or of field recordings on the sites represents a significant cost and remains constrained by aging with the evolution of the environment over time, whether natural or artificial,
the comparison with the object presents a few specific drawbacks (real time, robustness and image content constraints) with limitations due to poorly textured backgrounds such as, for example, in the case of a ship on the ocean, or on the other hand due to strongly textured backgrounds exhibiting quasi-periodicities,
the preparation to embed and process large and specific volumes of information,
the need for manual intervention, however minor, to correct any deviation is incompatible with a rapid preparation of the information.

In the case where there is no a priori information concerning the object, such as the size or the volume, the techniques that use a specific knowledge of these characteristics are not eligible. Furthermore, the performance levels attained by these techniques for objects at a great distance are, moreover, highly inadequate when it comes to the desired quality objective. Metric class location performance levels are in fact targeted.

For the operations that require analysis of the image information onboard the platform and during the gathering process, another locating procedure, called direct geo-referencing technique, has been developed. It is based on an instrumental device, embedded onboard a platform, consisting of a device for acquiring images of the scene where the object is situated, means for positioning the platform in a terrestrial coordinate system, such as a GPS (Global Positioning System), and means for determining the attitude of the image, including:
an inertial navigation unit (INU) on the platform to determine its orientation in the terrestrial coordinate system,
means for measuring the alignment of the sensor on the platform to determine the orientation of the sensor in the coordinate system of the platform,
means for orienting the line of sight (LoS) relative to reference axes of the sensor, by means of mechanical elements (coders) or inertial elements (IMU).

Once the image is acquired, two variants can be used to determine the geodesic position of the object:
the first uses the help of an altimetric model of the scene such as a digital terrestrial model assuming that the object is located on the Earth's surface; the position of the object is then obtained by intersecting, from the position of the sensor, the absolute direction defined by the image attitude with the terrestrial model (of the two solutions obtained, the correct position of the object corresponds to that of the shortest distance, the other is situated opposite the Earth's surface);
the second uses a distance measurement on the object by means of a range-finder embedded in the sensor and harmonized with the image.

For the operations that allow a delay in the use of the image information onboard the platform, location techniques based on stereoscopic vision can be used to determine the location of the object discretely. These methods still suffer from the quality of the attitude measurements, from the limited accuracy of the distance measurement obtained by the stereoscopic vision, and from the difficulties in robustly and automatically associating the image characteristics of the object. The patent application FR 06 01125 can be cited on this subject.

The quality of the attitude measuring components, of affordable cost, such as the magnetic compasses remains limited to a performance level in the order of around ten mrad because of the poor knowledge of the terrestrial field, without even beginning to take into account the difficulties of integration in the structure or of the local disturbances. Despite the evolution of the inertial components, the trend indicates that it will be several more years before we have, through these techniques, a geolocation of metric class and notably in exposure conditions of interest corresponding to strongly oblique views (or at a great distance from the object) in which the elevation angle error becomes highly detrimental to the planimetric geolocation error.

In fact, the inertial unit is used to find the heading, the attitude and/or the speed and the position of the platform. Its quality is limited by the performance of the sensors of which it is composed (gyroscopes, gyrometers, accelerometers, etc.). The threshold reached by an inertial unit of aeronautical class is in the order of the mrad which is too high for the performance levels sought. These systems also require an initialization and a correction of the drifts over time. Finally, it should be noted that access to a metric class location would require inertial components of high performance whose price is beyond reach for aero-terrestrial equipment.

The mounting of the sensor on the platform introduces a systematic error which requires an angular bias calibration procedure. This calibration is ideally performed in real time and dynamically since it depends on the thermal, mechanical or geomagnetic conditions of use.

These various errors are aggregated in the optronics acquisition system. The order of magnitude of these errors will be illustrated by a quantified example. The inertial unit typically has a random error of 1 mrad; the alignment means typically have a static bias of 10 mrad; the LoS orientation means typically have a random error of 3 mrad. In the absence or after estimation of the bias, there remains an overall random error of approximately 3 mrad which is reflected, for example, in an error on the ground of 70 m for an object on the ground situated at 10 km acquired from an observation point at 20 kft. The aim is for a metric performance, and at greater distances.

It is also possible to cite the geolocation methods that use lateration techniques (tri or multilateration) which are based on measurements of determined distances for example from the attenuation of a signal or a time of flight (ToF) for the most powerful among them. The following techniques have the drawback of the need for cooperation with the object or/and an electromagnetic (EM) emission constraint on the part of the latter:

the conventional GPS uses distance measurements by measuring times of propagation (TOA, standing for "Time Of Arrival") of radiofrequency signals, and cooperative receivers to locate a cooperating receiver; the position of the fixed or mobile object is determined by the intersection of spheres.

GSM (Global System for Mobile communication) is based on time measurement differences (TDOA, standing for "Time Difference Of Arrival") for positioning a personal receiver of cell phone type within a collaborating network of antennas; the position of the fixed or mobile personal receiver is determined by the intersection of hyperbolas. The performance level that can be accessed is 150 meters in an urban area and 5 kilometers in a rural area.

ESM, standing for "Electronic Support Measure" is a passive listening sensor which makes it possible to measure the angular direction of arrival of EM radiations emitted by a fixed object, and which thus locates it with a technique usually based on time measurement differences (TDOA).

More recently, cooperative techniques between airborne and terrestrial platforms have emerged. In these scenarios, either the terrestrial platforms produce a location of greater quality because they are at a shorter distance and are performed from fixed stations, or the airborne platform uses the positions communicated from the cooperating terrestrial platforms present within its image of interest as landmark point to perform the georeferencing of the image by a conventional photogrammetry technique.

The drawbacks of the techniques listed above mean that it is not possible to envisage geolocating a target or an object in the following conditions of implementation:

object inherently non-cooperative and not emitting EM radiation, automatically, therefore without manual intervention of the user during the process, robustly with respect to the environmental context, that is to say, independently of the nature of the structures present (or absent) in the scene, by systematically guaranteeing a solution regardless of the position of the object in space, notably in strongly oblique sight conditions, with high accuracy and precision compatible with metric class requirements, without requiring any calibration procedure, without requiring attitude measuring means (inertial, magnetic, astrometric), without a priori or hypothetical information concerning the knowledge of the object, without embedding or having information concerning the environment of the object, by dynamically estimating the quality on the position obtained, by being able to adapt the performance level to achieve a metric setpoint level, without systematically requiring the implementation of complex optimization processes, by being able to operate in conditions of maximum discretion and at a great distance from the object, independently with respect to communication means and cooperating infrastructures.

Consequently, there is not currently any system or solution available that simultaneously meets all the abovementioned requirements.

SUMMARY OF THE INVENTION

The solution of the invention illustrated in FIG. 1 is based on a distance measuring instrument such as a range-finder, coupled to a position measuring instrument such as a receiver of a GNSS (Global Navigation Satellite System) positioning system, both installed onboard a mobile platform 10.

The object location principle described in relation to FIGS. 1 and 2 is as follows.

A first pair of measurements P1-D1 is defined, P1 being the position of the range-finder and D1 the distance of the object O relative to that position. The object O is then positioned in the geodesic space on a sphere S1 centered on the position P1 of the range-finder obtained by the receiver of the GNSS system and whose radius is equal to the distance D1 supplied by the range-finder. After displacement of the platform 1 and therefore of the range-finder, a second pair of measurements P2-D2 is defined, and the corresponding second sphere S2, and the object O is positioned on this second sphere whose intersection with the first defines a circle on which the object O is situated. A third pair of measurements P3-D3 to which a third sphere S3 corresponds, makes it possible to search for the object at the intersection of the circle and of this third sphere giving two possible positions for the object in absolute space.

The choice of the position of the object O between these two possible positions can be made either by an approximate knowledge of the direction of the line of sight of the range-finder or by a fourth pair of measurements P4-D4 or by other additional measurements, or by the knowledge of an a priori item of information, such as, for example, the information according to which the object is adjacent to the Earth's surface.

In the preceding scheme, when working with the minimum number of measurements, it is possible to adopt without preference a local (or centralized) coordinate system for the measurements or a global coordinate system (or a decentralized one such as ECEF, standing for Earth-Centered Earth-Fixed).

In the case of superabundant measurements, the geolocation solution is obtained in a global coordinate system:

firstly by seeking an initial position by using the strict minimum of measurements then by feeding an estimator with the additional measurements. The estimator used may be an extended Kalman filter or any other estimator that makes it possible to have a refined position for each measurement and that delivers an associated quality representing the location error.

The principle represented relies on spheres, but as will be seen, it works in a particular way; it is possible to envisage other ways of determining the position of the object from the same "position-distance" pairs.

More specifically, the subject of the invention is a method for geolocating a fixed, non-cooperating object by means of an embedded system onboard a mobile platform, equipped with distance acquisition means for acquiring the distance between the object and the system, and position acquisition means for acquiring the position of the system, the method comprising steps for:

acquisition of two distance measurements (D1, D2) of the object relative to two distinct positions (P1, P2) of the system, thus defining two "object position-distance" pairs, the positions being those of the system and being obtained by the position acquisition means, and the distances being obtained by the distance acquisition means, acquisition of at least one other "object position-distance" pair, calculation of the position of the object from these "object position-distance" pairs.

This method thus makes it possible to provide, from three "object position-distance" pairs, of which only two of the pairs are measured, a position solution in a systematic way, that is to say unambiguously and without implementing any optimization procedure.

Thus, it is not essential to use the orientations which adversely affect the precision and accuracy budget. The locating of the object is thus performed by lateration method by using only the temporal positions of the range-finder and associated distance measurements; these measurements are deduced from time of flight (TOF) measurements, and we qualify it here as DOA (Distance of Arrival) measurement method. In this situation, the location budget relies only on the following contributions:

the measurements of positions of the platform and therefore of the range-finder which have the accuracy of the GNSS, that is to say a metric class accuracy, the distance measurements which inherently have a high accuracy and which are of metric class, where appropriate, the synchronization of the measurements of distance (sensor-object) and of position of the sensor, usually correctly handled on the platforms concerned.

The distance and the position measurements have very little bias and very low drift, hence the resulting great absolute precision on the location.

In addition to the accuracy obtained, the proposed solution resolves the problems described concerning the procedures:

the location quality can be adjusted by modifying the displacement of the range-finder with respect to the object depending on the freedom of the user and by modifying the frequency of the measurements depending on the desired discretion level, the process of measuring distance to the object by laser means that the object has no need to emit or collaborate with the user, the measurements analyzed do not need to be attitude or orientation measurements, thus doing away with any angle measurement recorded on the platform and the sensor and the associated error contribution, the simplicity with which the measurement is generated requires no particular calibration other than the harmonization of the range-finder to the imaging and their synchronization performed, moreover, as will be seen later, the proposed system and method make it unessential to have a terrestrial model to locate the object in 3D or for the latter to be situated on the Earth's surface.

This functionality can be produced totally automatically by a tracking function on the object locked on to by the imaging system or, in the extreme case, by manually pointing to, and if necessary realigning on, the object of interest.

It should be noted that on large objects (or objects at a shorter distance) the range-found position must be kept in the vicinity of the same zone. In this circumstance, a tracking on the image and a correct pointing of the range-finder are desirable to have a well-characterized position and better performance.

According to one characteristic of the invention, another pair is obtained by measuring the distance of the object relative to a position of the system that is distinct from the preceding positions, obtained by the position acquisition means, and the distance being obtained by the distance acquisition means.

For each pair, the distance and position measurements are preferentially synchronized by a global means (UTC, or Universal Time Coordinates, time-stamping associated with the GPS) or a relative means (IRIG, standing for "Inter-Range Instrumentation Group").

The distances are obtained from distance measurements. These may be based on the measurement of the time and speed of propagation of a signal which performs a round trip between the sensor and the object (range-finder, sonar), and other techniques may be used (with lower performance) such as the measurement of attenuation of the return signal (RSS, standing for received signal strength).

The calculation of the geolocation from the "position-distance" pairs is advantageously obtained from differences in said distances and from the sum of said distances.

According to another characteristic of the invention, another "object position-distance" pair is predetermined; it is such that the position is that of the center of the Earth and the distance is that of the object relative to the center of the Earth.

In certain cases, the distance of the object relative to the center of the Earth is obtained from a digital terrain model DTM or from a digital elevation model DEM; the object being situated on a circle called "object circle", this distance is obtained in the following iterative manner:

a—an initial position (longitude_init, latitude_init) is set, at the intersection between the circle of the object and a terrestrial sphere for a predetermined height, b—the height of this position is determined from the DTM, then the radius RT of the terrestrial sphere is determined by adding this height to the local radius of the terrestrial ellipsoid at the preceding position, c—the geodesic position of the object on the "object circle" is then determined at the intersection with a terrestrial sphere of radius RT, d—the preceding steps are then reiterated n times until a threshold is reached.

The threshold is, for example, a predefined distance between two successive positions of the object (possibly limited in planimetry or altimetry), or a fixed maximum number of iterations.

To improve accuracy, the height is determined in the step b, by the DTM and the geoid.

The preceding description relating to the digital model (DTM or DEM) corresponds to the processing of the measurements to establish a decentralized location. In a centralized approach, a Cartesian coordinate system is defined, whose origin is situated in the middle of the segment whose ends correspond to the two positions of the range-finder at the instants of the distance measurements.

The method may also comprise a step for calculating the geolocation error.

It possibly comprises a step for calculating the optimum trajectory of the platform that makes it possible to minimize said geolocation error.

The invention also relates to a geolocation system for geolocating a fixed non-cooperating object embedded onboard a mobile platform, and equipped with distance acquisition means for acquiring the distance between the object and the system, position acquisition means for acquiring the position of the system, and processing means for processing the method as described.

Preferentially, it comprises time-stamping means for time-stamping the acquired positions and distances and possibly an object tracking device, harmonized with the distance acquisition means.

BRIEF DESCRIPTION OF THE DRAWINGS

Other features and advantages of the invention will become apparent from reading the following detailed description, given as a nonlimiting example and with reference to the appended drawings in which.

From one figure to another, the same elements are identified by the same references.

DETAILED DESCRIPTION

Figure 1:
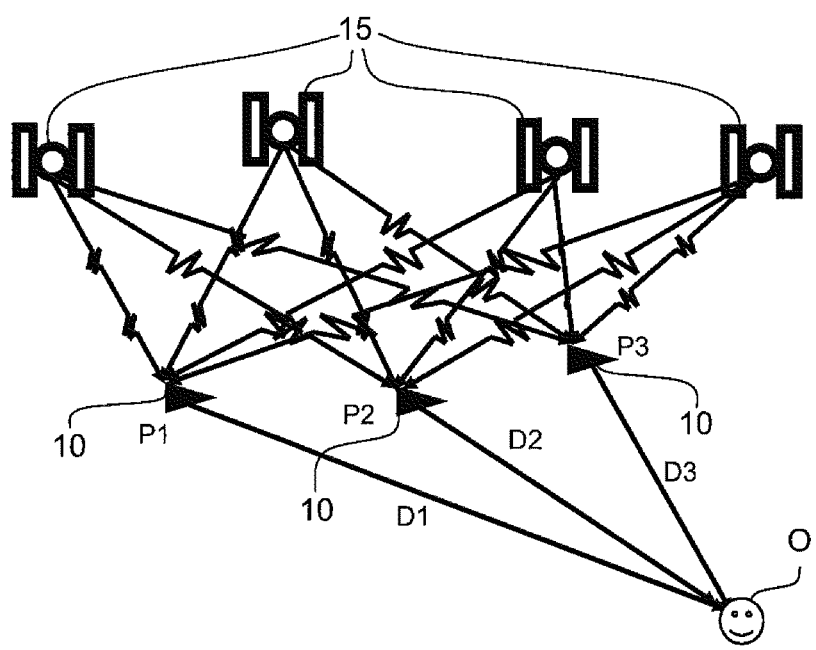
FIG. 1 schematically represents a number of "position-distance" pairs used to locate the object, FIG. 2 schematically illustrates the principle of the invention in the particular case of spheres represented in the plane by circles, FIG. 3 schematically represent, in-plane, two particular cases without solution, FIG. 4 schematically illustrates, in-plane, the method of locating based on two position-distance pairs and a digital terrestrial model, FIG. 5 schematically represents, in-plane, a zone of uncertainty in geolocation by spheres, FIG. 6 schematically represents, in-plane, a zone of uncertainty in the geolocation by an ellipse and a hyperbola, FIG. 7 schematically represents, in perspective, the intersection of an ellipsoid and a hyperboloid, FIG. 8b schematically illustrates the procedure for incrementally calculating the radius of a sphere on which the object is situated and whose center is the center of the Earth, the terminology being illustrated in FIG. 8a, FIG. 9 schematically represents an exemplary geolocation system according to the invention.

The solution of the invention illustrated in FIG. 1 is based on a receiver of a GNSS (Global Navigation Satellite System) positioning system, coupled to a range-finger, both installed onboard a mobile platform 10 and used as follows.

Preferentially, to be able to track the object automatically, the range-finder is associated with an imaging device that makes it possible to view the object at a great distance and keep it in the center of the image delivered by virtue, for example, of a deviation indicator; the range-finder is harmonized with this imaging device so as to remain pointed toward the object.

The distance to the object O is measured by the range-finder for different positions of the latter which result from the displacement of the platform; these distance measurements D1, D2, D3 are time-stamped, as are the positions P1, P2, P3, so as to be respectively synchronized with one another. The position of the range-finder is measured by the receiver of the global navigation satellite system (GNSS/GPS); it will be recalled that the position of a GNSS receiver is generally obtained by combining measurements obtained from 4 satellites 15 of the GNSS system.

Figure 2:
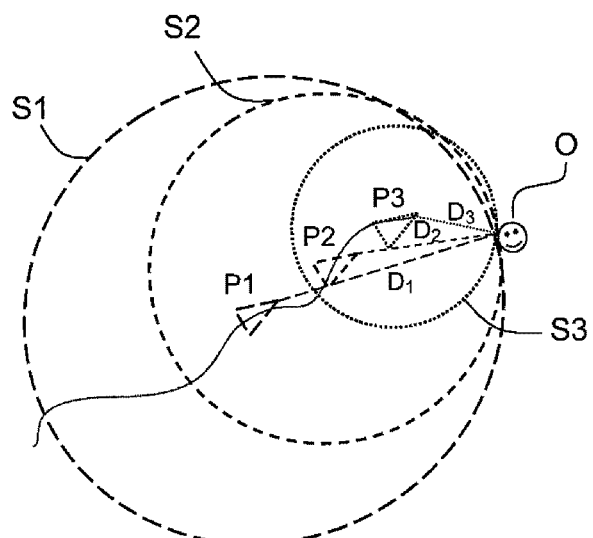

A first embodiment of the method according to the invention is described in relation to FIG. 2, based on the intersection of spheres.

For simplicity, FIG. 2 is an in-plane representation containing the object O and different positions P1, P2, P3, ... PN of the range-finder. The geolocation of the object O is obtained as follows:
knowing an absolute position P1 of the platform and therefore of the range-finder, and the distance D1 to the targeted object, the latter is positioned on a first sphere S1 in space (represented in the figure by a circle),
after displacement of the range-finder, another measurement of distance D2 to the targeted object provides a second sphere S2 in the space. The object O is then situated on the circle represented by the intersection of the preceding two spheres S1, S2.

A distance measurement D3 from a third position P3 of the range-finder defines a third sphere S3 whose intersection with the circle gives 2 points and therefore 2 positions for the object O.

Any measurement (DN, PN) with N>3, provides superabundant information and can be processed in the estimation process.

As will be seen later with FIG. 3, to have a single position, it is necessary for the points Pk not to be aligned. In this situation of non-observability, the different intersections of spheres are all aggregated in the vicinity of one and the same circle which does not make it possible to deduce a one-off position by a conventional approach. On the other hand, the proposed use with the DTM makes it possible to resolve this difficulty and to maintain a location capability provided that 2 measurements are available, including in the case of alignment of the positions Pk.

The real position of the object is theoretically set after three measurements, but the non-linear nature of the equations leads to an indeterminacy in the form of two solutions, one of which corresponds to that of the object O. To resolve the residual indeterminacy, it is possible either to exploit:
a priori information (for example, the point is above the Earth's surface, the range-finder is looking toward the front of the platform, etc.),
a very approximate angular measurement recorded on the platform,
a fourth distance measurement from another position of the range-finder.

We will now address:
the geolocation capability and, more precisely, the observability which guarantees the existence of a single solution, and the performance or location error characterized by the deviation between the solution obtained and the true position under the influence of measurement error.

Figure 5:
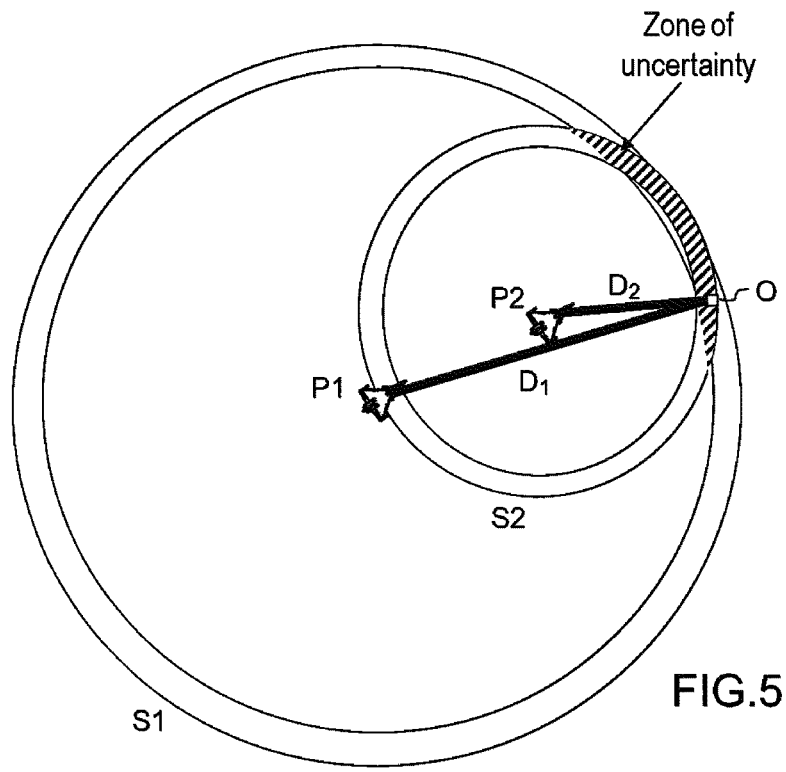

The geolocation error obtained from the intersection of three spheres is illustrated in FIG. 5 in a plane (for simplicity) where only 2 pairs of measurements are necessary. The error is contained in a zone of uncertainty (shaded in the figure) for which an example of size corresponding to the unitary random error is represented in this figure.

Figure 3A:
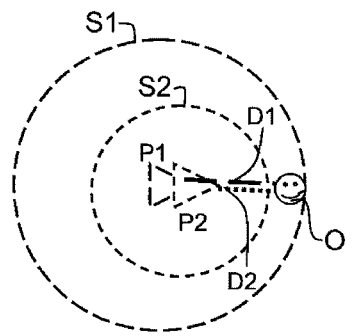
Figure 3B:
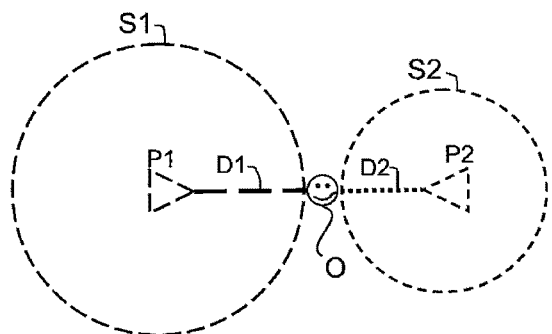

In certain cases illustrated by FIGS. 3*a* and 3*b*, the geometric conditions of acquisition of the "range-finder position—distance to object" measurement pairs do not guarantee the intersection of the spheres S1, S2. This situation occurs notably when at least two positions (for example P1, P2) are almost aligned with the object O so that S1 and S2 do not intersect; a fortiori, when P1, P2, P3 and O are aligned and the spheres S1, S2 and S3 do not intersect.

When working with a minimum number of measurements, it is possible to adopt without preference a local (or centralized) coordinate system for the measurements or a global (or decentralized) coordinate system. When a superabundant number of measurements is used to obtain the location on completion of an estimation process, the measurements are then processed in a decentralized way in a common coordinate system. This coordinate system is generally a geocentric Cartesian coordinate system (ECEF, standing for Earth-Centered Earth-Fixed) with its origin at the center of the Earth or a local Cartesian coordinate system, also called topocentric with its origin fixed in a geographic position preferentially situated in the vicinity of the measurements. Firstly, this problem will be dealt with in a plane and in a local coordinate system, then it will be generalized to three dimensions. In-plane, it is possible to consider only two pairs of measurements and therefore the corresponding two circles to obtain the position of the object which results from the intersection of these two circles.

Instead of the preceding two circles, it is proposed to use an effective method to obtain the solution, notably in the cases illustrated above in which the measurement equations do not provide a solution for the place of position of the object. For this, the "position-distance" pairs are used as follows.

Figure 6:
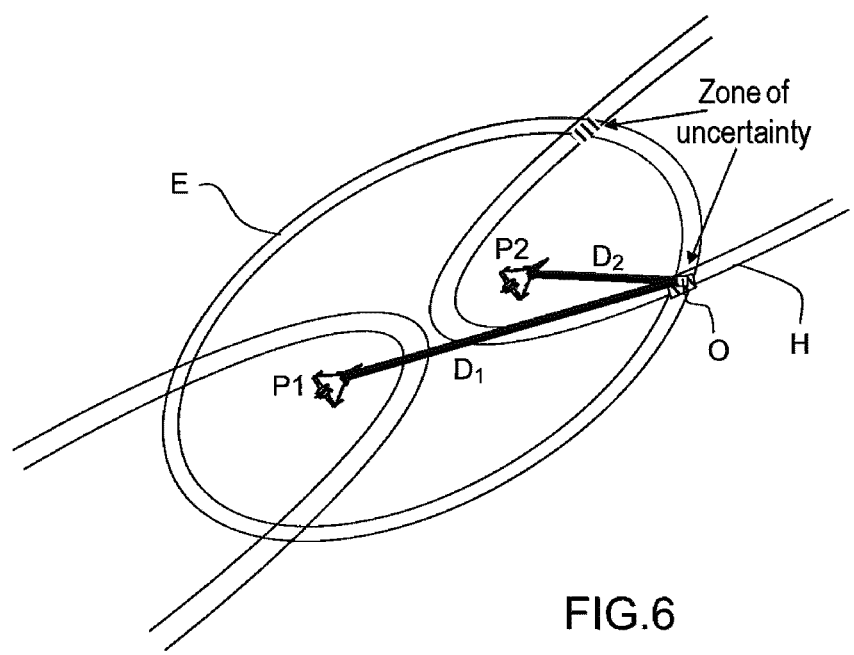

Two conic sections are defined, represented in FIG. 6, from two position-distance pairs designated P1 D1, P2D2: a hyperbola H and an ellipse E on which the object O is positioned.

The two foci of each are merged with the two distinct positions P1 and P2 of the range-finder.

The hyperbola H on which the object is positioned is defined as the place of the points where the difference in the distances D1–D2 is constant (the absolute value of this difference in fact); the ellipse E on which the object is also positioned, is defined as the place of the points where the sum of these distances D1+D2 is constant.

The half-axes a, b of these two conic sections are expressed simply and solely according to three distances: the two distances of the object measured by the range-finder and the base which is the distance P1P2 between the two positions of the range-finder obtained from the two GNSS measurements.

In the following expressions, the indices E and H respectively refer to the ellipse and the hyperbola; "a" is used to designate the great half axis of the conic section and "b", its small half axis:

the ellipse and hyperbola equations satisfy:

$$HE: \begin{cases} \sqrt{(x-x_1)^2+(y-y_1)^2} + \sqrt{(x-x_2)^2+(y-y_2)^2} = D_1 + D_2 \\ \sqrt{(x-x_1)^2+(y-y_1)^2} - \sqrt{(x-x_2)^2+(y-y_2)^2} = D_1 - D_2 \end{cases}$$

The equation for the ellipse is given according to these characteristic elements by:

$$\frac{x^2}{a_E^2} + \frac{y^2}{b_E^2} = 1$$

with:

$$2a_E = D_1 + D_2$$

$$2c_E = \sqrt{(x_2-x_1)^2+(y_2-y_1)^2} = r_{12}$$

$$b_E^2 = a_E^2 - c_E^2 = \frac{1}{4}[(D_1+D_2)^2 - r_{12}^2]$$

The hyperbola equations are given by:

$$\frac{x^2}{a_H^2} - \frac{y^2}{b_H^2} = 1$$

with:

$$2a_H = D_1 - D_2$$

$$2c_H = \sqrt{(x_2-x_1)^2+(y_2-y_1)^2} = r_{12}$$

$$b_H^2 = c_H^2 - a_H^2 = \frac{1}{4}[r_{12}^2 - (D_1-D_2)^2]$$

It is thus shown that the possible positions of the object O are given by the 4 pairs of coordinates ($\pm x_I, \pm y_I$) as follows:

$$x_I^2 = \frac{\frac{b_E^2}{a_E^2} + \frac{b_H^2}{a_H^2}}{\frac{b_E^2}{a_E^2} + \frac{b_H^2}{a_H^2}}; \quad y_I^2 = \frac{\frac{a_E^2 - a_H^2}{b_E^2} }{\frac{a_E^2}{b_E^2} + \frac{a_H^2}{b_H^2}}$$

or else:

$$x_I^2 = \frac{(b_E^2 + b_H^2)a_E^2 a_H^2}{a_E^2 b_H^2 + a_H^2 b_E^2}; \quad y_I^2 = \frac{(a_E^2 - a_H^2)b_E^2 b_H^2}{a_E^2 b_H^2 + a_H^2 b_E^2}$$

Or, by substituting the distance measurements to the object from the positions P1 and P2 and by denoting the base between the two measurements ($r_{12}$):

$$x_I^2 = \left(\frac{D_1^2 - D_2^2}{2r_{12}}\right)^2; \quad y_I^2 = \frac{[(D_1+D_2)^2 - r_{12}^2][r_{12}^2 - (D_1-D_2)^2]}{4r_{12}^2}$$

To keep only the correct position, it is possible to calculate the equations of the circle of center P1 and of radius D1 and of the circle of center P2 and of radius D2. The difference in the equations for these two circles giving a linear relationship in x and y, two of the four preceding pairs are eliminated (they are situated on the hyperbola branch opposite to the direction of sight). The other position can be eliminated by an a priori knowledge or angular information (on the side on which the point is situated relative to the direction $r_{12}$) whose level of precision is sufficient to distinguish the resulting two positions:

These analytical expressions provide four solutions for the position, two of which coincide with those obtained with the two circles in the local coordinate system. In the case where the distance D1 is greater than the distance D2 and where the sensor is directed toward the object, these two solutions correspond to a positive $x_I$ with the choice made for the orientation of the axis. The expression of the position in the local coordinate system is much simpler than that obtained by working directly in the global coordinate system. It will be recalled that the local coordinate system is a relative coordinate system defined relative to the two positions P1 and P2: it is a three-dimensional coordinate system, one axis of which is supported by the segment P1P2. The global coordinate system is a geographic absolute coordinate system.

Once the position is obtained in the local coordinate system, the position in the global coordinate system is obtained linearly by simple translation and rotation.

In terms of precision, the solution obtained in the proposed local coordinate system is similar to the solution obtained in the global coordinate system from the two circles in the geometrical configurations where the latter exists. Its main advantage relies on its permanent existence regardless of the measurement errors and geometry. It is shown that the ellipses and hyperbolas always intersect at right angles for all the positions in space. This situation is different in the coordinate system of the solution based on two circles or based on two hyperbolas or two ellipses or other combination of one of these conic sections with a circle. This method based on the ellipse and hyperbola offers the additional advantage of separating the zone of uncertainty and of always presenting a result obtained as can be seen in FIGS. 5 and 6. It is easy to show analytically that the ellipses and hyperbolas always intersect at perpendicular tangents whereas the two circles intersect at angles which can be very small.

Furthermore, the "hyperbola-ellipse" method offers a certain interest in the situations where the solution of intersection with circles does not exist because of the measurement errors. The "hyperbola-ellipse" method always makes it possible to obtain a solution, and to do so simply and rapidly, since it does not require any specific minimization or optimization process.

Figure 7:
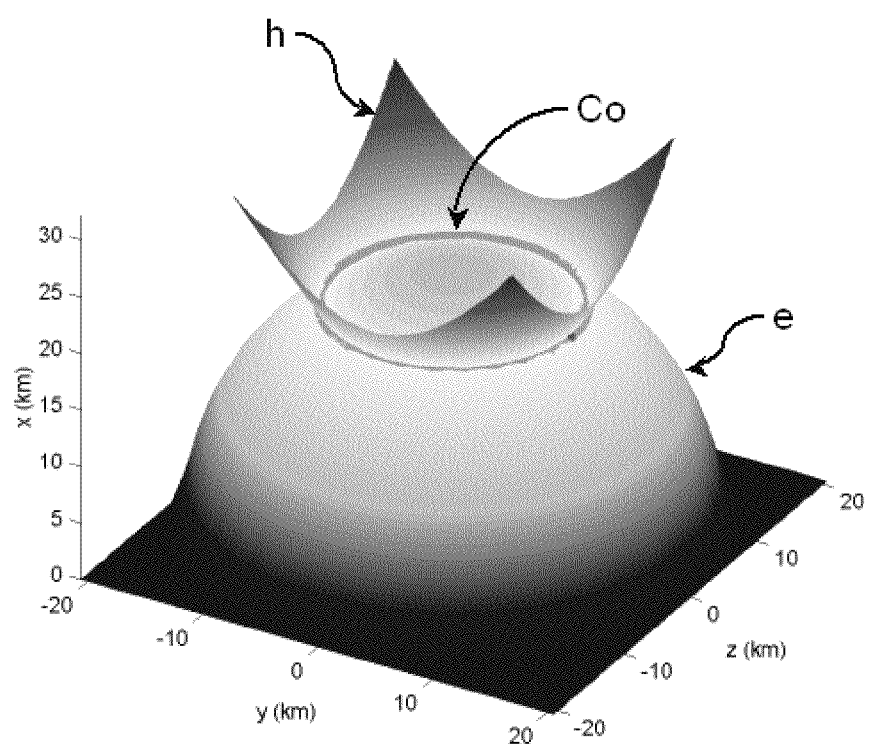

In space, the preceding solution is easily generalized. The two positions P1, P2 of the range-finder being on two foci, the surfaces used, shown in a half-space in FIG. 7, are:
 the ellipsoid "e" as the place of the points situating the object at the sum of the constant distances to the two foci,
 the hyperboloid "h" as the place of the points positioning the object as the constant difference in distances of the two foci.

The intersection of the two surfaces is simply expressed as the intersection of a cylinder whose axis is supported by the two positions of the range-finder and two planes perpendicular to the cylinder. Whatever the measurement errors, an intersection represented by two circles in space is therefore always obtained, which makes it possible to process the situations in which the range-finder is approaching the object in a quasi-rectilinear and quasi-frontal manner, illustrated by FIGS. 3*a* and 3*b*. One of these circles Co is shown in FIG. 7.

More specifically, 2 measurements are considered, the most appropriate of the 3; the axis X is placed in the direction of the two positions P1 and P2 of the range-finders at the two measurement instants, the origin being situated in their middle and the corresponding ellipsoid and hyperboloid of revolution are considered.

These two surfaces intersect according to two circles equivalent to the two spheres corresponding to the two distance measurements that were used to generate them. In practice, the equation of the circle is simple to obtain with the preceding two expressions. This corresponds to the intersection:
 of the cylinder with circular section whose axis is the basic measurement direction (axis X) and whose radius $R_I$ satisfies:

$$R_I^2 = y^2 + z^2 = \frac{a_e^2 - a_h^2}{\frac{a_e^2}{b_e^2} + \frac{a_h^2}{b_h^2}}$$

and of the two planes perpendicular to the axis X whose equations also satisfy:

$$x_I^2 = \frac{b_e^2 + b_h^2}{\frac{b_e^2}{a_e^2} + \frac{b_h^2}{a_h^2}}$$

The indices "e" and "h" respectively refer to the ellipsoid and to the hyperboloid; "a" designates the great half axis of the conic section and "b", the small half axis.

One of the circles, designated circle of the object Co, is situated toward the object (generally in front of the range-finder), the second which is directed in the opposite direction can be easily eliminated.

The 3D position is then obtained by:
 either by an additional distance measurement,
 or by the use of a digital model which makes it possible to know the height of the terrain at the level of the object, for a more effective solution, because the zone of uncertainty determined by the intersection of the curves is smaller in this case.

Figure 4:
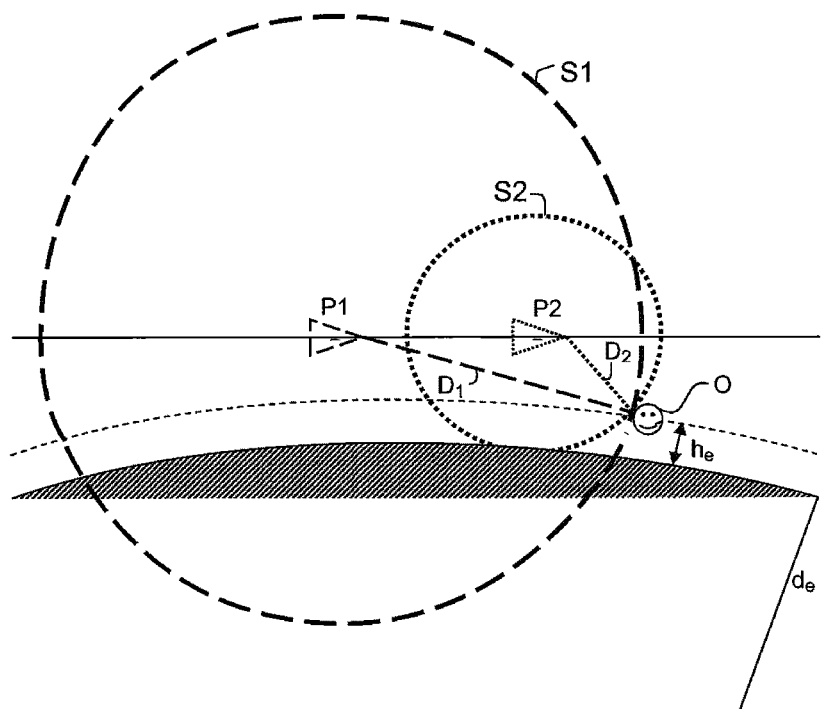

There now follows a description of the use of a digital terrain model DTM, standing for "Digital Terrestrial Model", or of a digital elevation model DEM which makes it possible to know the height of the terrain at the level of the object. It is then possible to establish a sphere, called terrestrial sphere, whose center is situated at the center of the Earth and whose radius is the distance between the center of the Earth and the object considered, as illustrated in FIG. 4.

Figure 8A:
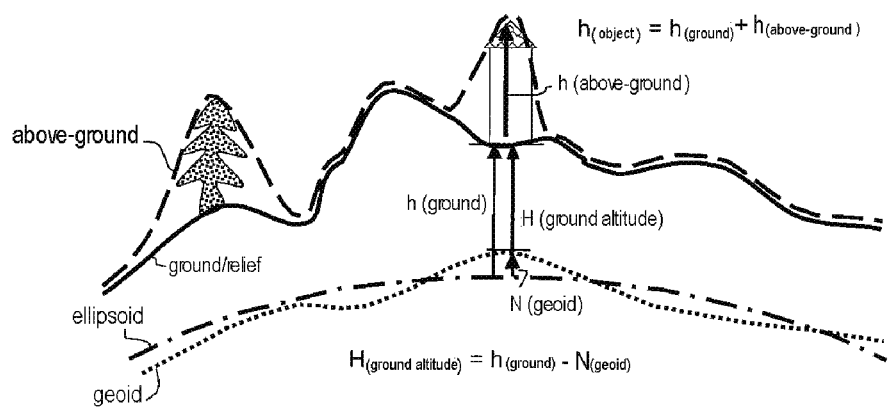

The Earth is not strictly likened to a sphere. The distance from a point of interest of the object (qualified as height) to the center of the Earth is determined by a sum of contributions illustrated in FIG. 8*a*:
 the height $h_{ground}$ of the point of the ground on the ellipsoid, also designated HAE, standing for "Height Above Ellipsoid", which in turn corresponds to the sum of the height $N_{geoid}$ of the geoid over the ellipsoid and of the altitude $H_{ground\ altitude}$ of the point such that it can be entered in a DTM (with reference to a geoid corresponding to the surface where the field of gravity takes the mean sea level MSL value; this altitude $H_{ground\ altitude}$ is also designated orthometric altitude;
 the specific height of the object above the terrain is $h_{above\text{-}ground}$; this information can be obtained by a digital above-ground model (MNS) or digital elevation model (the DEM is a fine DTM). The height of the object $h_{object}$ relative to the center of the Earth is finally given by the formula: $h_{object} = h_{ground} + h_{above\text{-}ground}$.

In practice, the GPS directly provides the height $h_{ground}$ over the ellipsoid of the position of the receiver. A low resolution DTM (typically level 1 or 2 DTED, DTED standing for "Digital Terrestrial Elevation Data") provides the orthometric altitude of a point (height $H_{altitude}$ relative to the geoid or MSL) whereas a high resolution DTM (level 4 to 5 DTED) provides the elevation of the artificial objects.

The radius is determined incrementally because the position of the object is not known a priori. Thus, an iterative procedure is proposed, which, starting from a height assumption will iterate between the information provided by the measurements and that provided by the model. The aim is more specifically to change the terrestrial radius by the value given by the DTM and to calculate new geodesic coordinates of the object with the new terrestrial sphere passing through the height found, then to use the new geodesic coordinates to have a new height available for the DTM. The process is stopped when the deviation between two successive planimetric (or altimetric) positions is below a predetermined threshold.

The two measurements are used to position the object O on a circle (situated in a plane that is rather vertical given that the platform moves in a plane that is rather horizontal); moreover, the model situates the object at a fixed height and therefore on a sphere whose radius of very large dimension makes it possible to liken it to a virtually horizontal plane in a topocentric geographic coordinate system (or RGL).

Figure 8B:
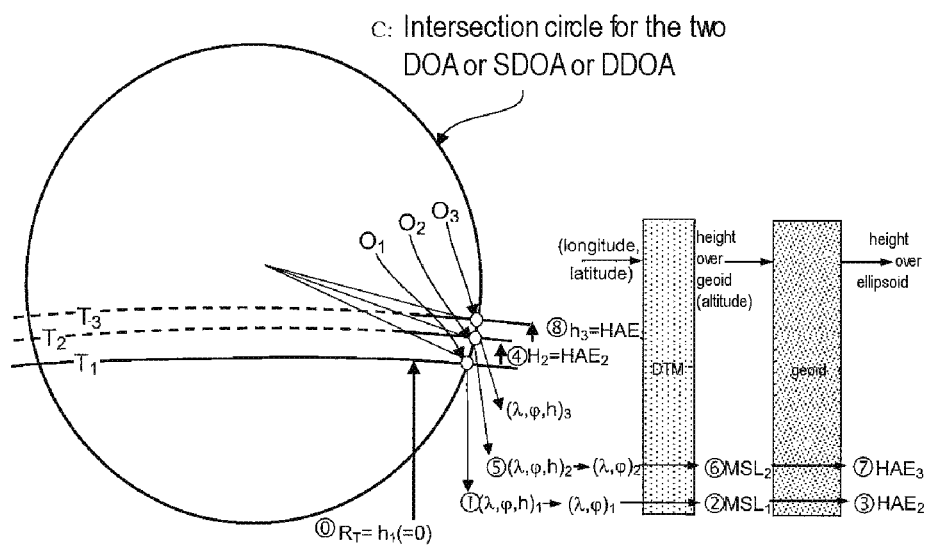

Practically, this process is first illustrated in FIG. 8b in a global coordinate system; the center and the radius of the circle C are respectively the in-plane projection of the circle of the position P1 (or P2) and of the distance D1 (or D2). The process proceeds as follows:

1—From the two distance measurements which define the circle C, and from a terrestrial sphere $T_1$ of radius RT defined assuming the height of the ground to be zero ($h_{ground}=0$), a first position is obtained. In practice, it is possible to use another height of the targeted object, such as, for example, that at the level of the platform (or at the nadir of the sensor). A first geodesic position $O_1$ is thus obtained ($\lambda 1$, $\phi 1$, h(object)1=0) which is the intersection of the circle C and of the terrestrial sphere $T_1$. In reality, two points are solution but one of them can be eliminated simply by one of the methods already indicated moreover.

2—From the planimetric positions (geodesic longitude $\lambda 1$ and latitude $\phi 1$) obtained, the use of the DTM gives a new height over the geoid $H_{ground\ altitude}1$ or altitude MSL1, the acronym standing for "Mean Sea Level" to explain the reference of altitude to the mean sea level. The transition between this height over the geoid $H_{ground\ altitude}1$ to the height over the ellipsoid (HAE) $h_{ground}2$ is produced according to the height $N_{geoid}$ of the local geoid. This information is embedded on the sensor because it occupies little space and changes little over time. $h_{ground}2$ is obtained according to the formula $h_{ground,\ n+1}=N_{geoid}+H_{ground\ altitude,\ n}$ (or $HAE_{n+1}=N_{geoid}+MSL_n$).

3—Having a new HAE (height $h_{ground}2$), a new terrestrial sphere $T_2$ of radius $RT+h_{ground}2$ is deduced, which makes it possible to find, as in step 1, a new geodesic position $O_2$ (80 2, $\phi 2$, h(object)2), the intersection of $T_2$ and of the circle C.

4—As in step 2, the coordinates ($\lambda 2$, $\phi 2$), and the DTM are used again to find a new $H_{ground\ altitude}2$, then the geoid is used again to find a new HAE (height $h_{ground}3$) for which is deduced a sphere $T_3$ of radius $RT+h_{ground}3$ and a new position $O_3$ ($\lambda 3$, $\phi 3$, h(object)3), the intersection of $T_3$ and of the circle C.

The process is iterated until the distance between two consecutive points $O_n$ and $O_{n+1}$ is less than a reference distance.

The process is now described by using the DTM in the local coordinate system. The transition from the global coordinate system, for example ECEF, to this local coordinate system involves only rotations and a translation; also, the equation of the ellipsoid is transformed into another ellipsoid equation (and the same applies for the equation of the approximate spherical shape which is transformed into the equation of another sphere). In detail, this approach starts from the expression of the surface of the terrestrial ellipsoid as geocentric coordinates, the ellipsoid passing through a point of height h, is expressed:

$$\frac{X_G^2+Y_G^2}{(a+h)^2}+\frac{Z_G^2}{(b+h)^2}=1$$

In the topocentric coordinate system, given the equations for transition from the geocentric coordinate system (ECEF) to the topocentric coordinate system $(X_G, Y_G, Z_G) \to (X_T, Y_T, Z_T)$, the equation for this ellipsoid is expressed by:

$$(b+h)^2\{X_T^2+[Y_T\sin\phi_0-Z_T\cos\phi_0-(N_0+h)\cos\phi_0]^2\}+(a+h)^2\{[Y_T\cos\phi_0+Z_T\sin\phi_0+(N_0|1-e^2|+h_0)\sin\phi_0]^2\}-(b+h)^2(a+h)^2=0$$

in which ($\lambda_0$, $\phi_0$, $h_0$) are the coordinates of the origin of the local coordinate system and $N_0$ the great normal to the ellipsoid at this point:

$$N_0=\frac{a}{\sqrt{1-e^2\sin^2\phi_0}}$$

Note that, by likening the Earth to a sphere having the local radius $R_0$ given by, $$R_0=\sqrt{M_0 N_0} \quad \text{with:} \quad M_0=\frac{a(1-e^2)}{(1-e^2\sin^2\phi_0)^{3/2}}$$

the equation for the terrestrial surface in the local coordinate system is expressed as:

$$\{X_T^2+[Y_T\sin\phi_0-Z_T\cos\phi_0-(N_0+h_0)\cos\phi_0]^2\}+\{[Y_T\cos\phi_0+Z_T\sin\phi_0+(N_0|1-e^2|+h_0)\sin\phi_0]^2\}-(R_0+h)^2=0$$

In other words the expression of a sphere in the topocentric coordinate system which is written, based on constants $A_0$, $B_0$, $C_0$ expressed on the basis of the constants of the preceding equation, as:

$$X_T^2+Y_T^2+Z_T^2+2(B_0\cos\phi_0-A_0\sin\phi_0)Y_T+2(B_0\sin\phi_0-A_0\cos\phi_0)Z_T+A_0^2+B_0^2-C_0^2=0$$

This expression is then written simply, by retaining the geometry of the sphere, in the local coordinate system of the two measurements by applying the two rotations about z and y described previously. These two rotations linearly link the coordinates of the local coordinate system to those of the topocentric coordinate system. By substituting the two equations of the cylinder and of the plane corresponding to the information provided by the ellipsoid and the hyperbola, it can be noted that:

$$X_T^2+Y_T^2+Z_T^2=X_L^2+Y_L^2+Z_L^2=R_I^2+x_I^2=\text{constant}$$

Thus, the intersection with the local sphere defines a plane in the 3D space which is parameterized according to the height h of the object sought. As in the decentralized approach, each iteration leads to two positions for the position of the object. One of them corresponds to the sought position, the other can be simply eliminated according to the approaches already described.

The method according to the invention may also include an additional step aiming to reduce the geolocation error to a minimum value. This is a step for calculating the optimum trajectory of the platform and therefore of the range-finder and of the optronic system, making it possible to minimize said geolocation error.

There are a number of processes that lead to the simple definition of a trajectory of the platform in order to have a better geolocation performance for the targeted object. For this, two approaches can be used, based on Fisher information:
- one locally optimizes the trajectory by determining, in each time step, the best orientation for the speed vector of the platform (or its heading) and thus defining the trajectory by successive approximation,
- the other globally optimizes the trajectory in 2 possible ways:
  - either by setting a time frame, or, in an equivalent manner for a given average speed of the platform, a maximum distance that can be reached from the initial position
  - or by setting two extreme positions, one corresponding to the initial position and the other to a position that has to be reached by the platform during its mission (or even an extension in uniform rectilinear movement over a fixed time frame).

The calculation of an optimum solution involving redundant pairs of measurements can be performed by using the properties of the solution obtained according to the method described and its associated error according to two approaches for processing more than 3 "position, distance" pairs:
- in the first, a conventional estimation method uses the location obtained according to the method described, ensuring the provision of an approximate initial location solution and of its covariance expressed in the global coordinate system. The optimization is then performed conventionally by an estimator by processing the measurements in batches (batch of weighted least squares type) by a linearization of the equations around the approximate solution or by a recursive approach (of Kalman filtering type).
- in the second, the N(N-1)/2 pairs of distance positions are used by calculating, for each of them, an analytical position solution in the local coordinate system then in the global coordinate system by weighting each solution by using the error associated with it. The decorrelation of the measurements of the pair and between each pair makes it possible to estimate the resultant position by processing N-1 pairs for each new available pair.

The measurements of position of the range-finder and the measurements of distance to the object must be time-stamped to be respectively synchronized before the step for calculation of the geolocation based on these measurements. This operation is performed simply if the respective rates of the measurements are very different, otherwise by filtering in time one or both of the information items. To this end, the position and distance measurements are preferentially time-stamped with the GPS time measurement or via a signal according to the B format synchronization IRIG standard.

The performance that can be accessed relies on:
- the performance of the positioning of the platform with, generally, inertial means coupled to the GNSS (Global Navigation Satellite System). Advances made in the performance of the latter make it possible to use low-cost inertial devices and the imminent arrival of systems such as Galileo should further improve the positioning capabilities of the sensor. The trend in the processing operations associated with these techniques make it possible to envisage positioning precisions of the order of 10 cm (GPS-RTK). To obtain a location of the object whose performance is of metric order, it is essential to have an accuracy of the same order, or even of a lesser order of magnitude concerning the positioning of the sensor. For this, it is desirable to have a decimetric accuracy on the trajectography and in this case, differential GPS (DGPS) techniques must be implemented. These techniques may be based on:
  - the "DGPS code"; they then correct the pseudo-distances (affected by clock and ephemeras errors, the troposphere and the ionosphere) between the mobile GPS receiver and the satellites that it receives. In fact, a reference receiver, stationed at a predetermined point, receives, at each instant, the position of the satellites in space, and calculates its own position. This receiver can therefore determine the theoretical distance to each satellite and the propagation time of the corresponding signals. The comparison of these theoretical values with the real values makes it possible to calculate differences which represent errors on the received signals. The corrections of pseudo-distances defined by the "Radio Technical Commission for Maritime Services" (RTCM) are derived from these differences. These RTCM corrections are transmitted to the mobile receiver, thus enhancing the accuracy of the location to a metric level.
  - the "DGPS phase"; they then use the phase measurement corrections, standardized by the RTCM, calculated at the level of the reference then transmitted to the mobile. Thus, the location error can be reduced to less than 10 cm by receiving 5 kbit/s of corrections in the RTCM-RTK format, provided that the mobile receiver is some 10 km distant from the reference station.
- The distance measurement performance of the means envisaged is of metric class when airborne at a great distance. It depends notably on the conditions of acquisition (geometry), on the quality of the instrumental measurements and on the processing operations implemented.
- The time-stamping and synchronization performance accessible for the measurements is of the order of 10 μs.

These contributions make it possible to envisage a location of metric performance at great distance.

Figure 9:
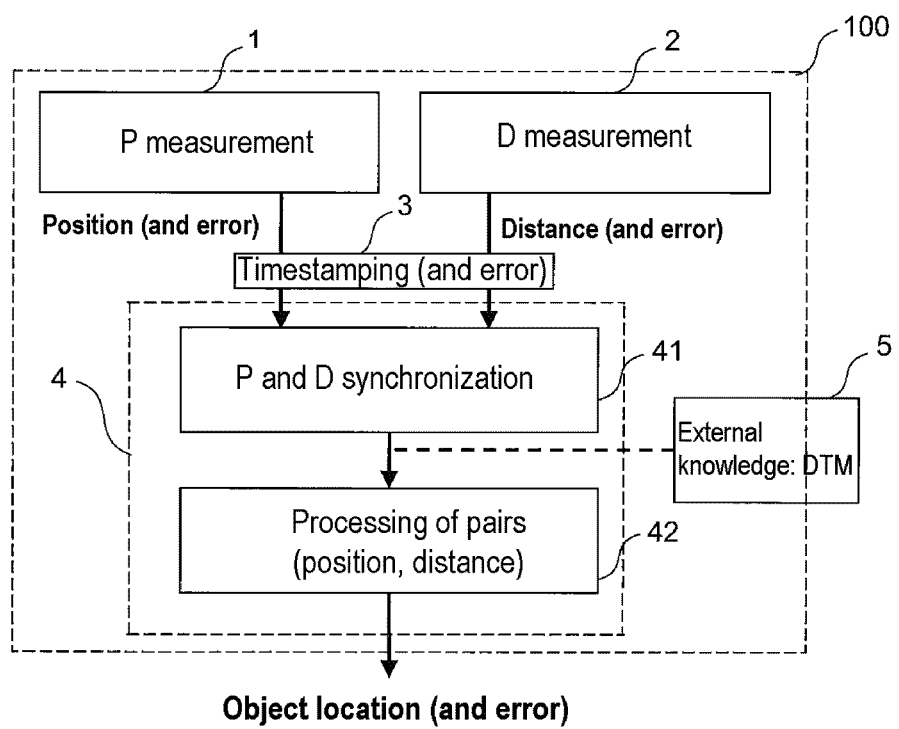

Reference is now made to FIG. 9. The method according to the invention can typically be implemented in an embedded system 100 onboard a platform and equipped with acquisition means 1, 2 for acquiring "position-distance" pairs and a processing unit 4 for the method described. These acquisition means are, for example:
- a range-finder 2 for acquiring the distance D and the error, or any other appliance capable of estimating a distance either by time of flight (by marking EM signals, etc.) or by attenuation of a signal,
- a GNSS device 1 for acquiring the position P of the system and the error, or any other appliance capable of estimating a position, such as, for example, a star tracker or a method for positioning on landmarks.

The system can also be provided with a time-stamping device 3 for time-stamping the acquired distances and positions.

The processing unit comprises a subunit 41 for synchronizing the positions P and the distances D and a subunit 42 for processing the "synchronized position-distance" pairs, possibly based on a pair obtained by DTM 5.

The system advantageously comprises:
- an image acquisition and imaging-based tracking device, so as to automate the geolocation without requiring manual intervention during processing;
- a device for harmonizing the laser axis on the axis of the imaging system in order not to degrade the precision of the measurement of distance to the object;
- an infra-red detector in order to be able to perform the function during the day and at night.

The platform is typically an aircraft. It may also be a terrestrial or maritime vehicle. The system may also be carried by a pedestrian.

The invention claimed is:

1. A method for geolocating a fixed, non-cooperating object by means of an embedded system onboard a mobile platform, the embedded system being equipped with distance acquisition means for acquiring the distance between the fixed, non-cooperating object and the embedded system, and position acquisition means for acquiring the position of the embedded system, the method comprising:
   acquiring two distance measurements of the fixed, non-cooperating object relative to two distinct positions of the embedded system, defining two object position-distance pairs, the two distinct positions of the embedded system being obtained by the position acquisition means, and the two distance measurements of the fixed, non-cooperating object being obtained by the distance acquisition means,
   acquiring at least one other distance measurement of the fixed, non-cooperating object relative to another distinct position of the embedded system or to at least one position of another non-cooperating object, defining at least one other object position-distance pair, and
   calculating a geolocation of the fixed, non-cooperating object based on the two object position-distance pairs and the at least one other object position-distance pair.

2. The method according to claim 1, wherein acquiring the other object position-distance pair comprises measuring the distance of the fixed, non-cooperating object relative to the other distinct position of the embedded system, the position of the embedded system being obtained by the position acquisition means, and the distance measurement of the fixed, non-cooperating object being obtained by the distance acquisition means.

3. The method according to claim 1, wherein, for each of the object position-distance pairs, the distance and position measurements are synchronized.

4. The method according to claim 1, wherein the distance measurements are obtained from time measurements.

5. The method according to claim 1, wherein, for the other object position-distance pair, the at least one position of the other non-cooperating object is the position of the center of the Earth and the distance measurement of the fixed, non-cooperating object is the distance of the fixed, non-cooperating object relative to the center of the Earth.

6. The method according to claim 5, wherein the distance measurement of the fixed, non-cooperating object relative to the center of the Earth is obtained from a digital terrain model or from a digital elevation model.

7. The method according to claim 6, wherein the fixed, non-cooperating object is situated on an object circle, and the distance measurement is obtained by:
   calculating an initial position, at an intersection between the object circle and a terrestrial sphere having a radius determined for a predetermined height of the fixed, non-cooperating object,
   determining a real height of the initial position from the digital terrain model,
   determining the radius of the terrestrial sphere by adding the real height to the radius of the ellipsoid of the Earth in the initial position,
   determining a geodesic position of the fixed, non-cooperating object on the object circle at the intersection with a terrestrial sphere, and
   reiterating the determining of the real height, the radius, and the geodesic position n times until a threshold is reached.

8. The method according to claim 7, wherein the threshold is a predefined distance between two successive positions of the fixed, non-cooperating object, or the threshold is a number N to be compared to n.

9. The method according to claim 7, wherein, the real height is determined by the digital terrain model and a geoid.

10. The method according to claim 1, wherein the geolocation of the fixed, non-cooperating object calculated based on the two position-distance pairs is obtained from the two distinct positions, from a difference in the distances associated with the two distinct positions, or from the sum of the distances associated with the two distinct positions.

11. The method according to claim 1, further comprising:
   calculating two first surfaces, namely a hyperboloid as a function of the two distinct positions and of a difference in the distances associated with the two distinct positions, and an ellipsoid as a function of the two distinct positions and of a sum of the two distances, the fixed, non-cooperating object being situated at an intersection of the two first surfaces and of a third surface determined from the at least one other object position-distance pair.

12. The method according to claim 1, wherein the geolocation of the fixed, non-cooperating object calculated is obtained from two positions, one position being the other distinct position of the embedded system or the at least one position of the other non-cooperating object, from a difference in two distances associated with the two positions, or from a sum of the two distances.

13. The method according to claim 11, further comprising:
   calculating a third surface from two positions, one position being the other distinct position of the embedded system or the at least one position of the other non-cooperating object, from a difference in two distances associated with the two positions defining another hyperboloid, or from a sum of the two distances defining another ellipsoid, and
   calculating an intersection between the three surfaces, where the fixed, non-cooperating object is situated.

14. The method according to claim 13, wherein:
   calculating the third surface comprises calculating the third surface from a sphere defined as a function of the other distinct position of the embedded system or the at least one position of the other non-cooperating object and from the at least one distance measurement.

15. The method according to claim 13, further comprising:
   calculating a covariance of the location of the fixed, non-cooperating object, and processing more than three position-distance pairs, the processing being initialized from the location of the fixed, non-cooperating object and from the covariance.

16. The method according to claim 10, wherein the the geolocation of the fixed, non-cooperating object is calculated based on a sphere defined as a function of the position and the distance of an object position-distance pair other than the two object position-distance pairs.

17. The method according to claim 1, further comprising: calculating a geolocation error.

18. The method according to claim 17, further comprising: calculating an optimum trajectory of the mobile platform to minimize said geolocation error.

19. A geolocation system for geolocating a fixed non-cooperating object, the system being embedded onboard a mobile platform and comprising:
   distance acquisition means for acquiring the distance between the fixed, non-cooperating object and the geolocation system,
   position acquisition means for acquiring the position of the geolocation system, and
   processing means for processing the method according to claim 1.

20. The geolocation system according to claim 19, further comprising:
   time-stamping means for time-stamping the acquired distance and position.

21. The geolocation system according to claim 19, further comprising:
   an object tracking device, harmonized with the distance acquisition means.

22. The geolocation system according to claim 19, further comprising:
   means for calculating an optimum trajectory of the system, making it possible to minimize a geolocation error.

23. The geolocation system according to claim 19, wherein the distance acquisition means includes a range-finder and the position acquisition means includes a Global Navigation Satellite System.

* * * * *